United States Patent
Furukawa

(10) Patent No.: US 9,167,135 B2
(45) Date of Patent: Oct. 20, 2015

(54) IMAGE PROCESSING DEVICE, IMAGE PROCESSING METHOD, PHOTOGRAPHIC IMAGING APPARATUS, AND RECORDING DEVICE RECORDING IMAGE PROCESSING PROGRAM

(71) Applicant: OLYMPUS CORPORATION, Tokyo (JP)

(72) Inventor: Eiji Furukawa, Saitama-ken (JP)

(73) Assignee: OLYMPUS CORPORATION, Tokyo (JP)

( * ) Notice: Subject to any disclaimer, the term of this patent is extended or adjusted under 35 U.S.C. 154(b) by 183 days.

(21) Appl. No.: 13/959,320

(22) Filed: Aug. 5, 2013

(65) Prior Publication Data

US 2013/0314557 A1    Nov. 28, 2013

Related U.S. Application Data

(63) Continuation of application No. PCT/JP2011/079170, filed on Dec. 16, 2011.

(30) Foreign Application Priority Data

Feb. 16, 2011    (JP) .................................. 2011-031119

(51) Int. Cl.

| | |
|---|---|
| H04N 5/228 | (2006.01) |
| H04N 5/225 | (2006.01) |
| G06T 5/00 | (2006.01) |
| G06T 5/50 | (2006.01) |
| H04N 5/14 | (2006.01) |
| H04N 5/21 | (2006.01) |

(52) U.S. Cl.
CPC ................ *H04N 5/225* (2013.01); *G06T 5/002* (2013.01); *G06T 5/50* (2013.01); *H04N 5/145* (2013.01); *H04N 5/21* (2013.01); *G06T 2207/20201* (2013.01); *G06T 2207/20221* (2013.01)

(58) Field of Classification Search
CPC ....... H04N 5/225; H04N 5/144; H04N 5/145; H04N 5/23254
USPC .................. 348/208.1, 208.2, 208.6
See application file for complete search history.

(56) References Cited

U.S. PATENT DOCUMENTS

| | | |
|---|---|---|
| 8,169,490 B2 | 5/2012 | Kondo et al. |
| 8,243,150 B2 | 8/2012 | Hitomi et al. |
| 2010/0201828 A1 | 8/2010 | Mitsuya et al. |

FOREIGN PATENT DOCUMENTS

| | | |
|---|---|---|
| JP | 2008-123396 A | 5/2008 |
| JP | 4321626 B2 | 8/2009 |
| JP | 2009-301463 A | 12/2009 |
| JP | 2010-147986 A | 7/2010 |
| JP | 2010-183386 A | 8/2010 |
| JP | 2010-278701 A | 12/2010 |

OTHER PUBLICATIONS

International Search Report (ISR) dated Mar. 6, 2012 (and English translation thereof) issued in International Application No. PCT/JP2011/079170.

*Primary Examiner* — Twyler Haskins
*Assistant Examiner* — Quang Le
(74) *Attorney, Agent, or Firm* — Holtz, Holtz, Goodman & Chick PC

(57) ABSTRACT

An image processing device includes: a motion-vector computation unit that computes a motion vector between a base image and a reference image; a motion compensation unit that performs a motion compensation to align the reference image with the base image based on the motion vector; a contrast computation unit that computes a contrast value of a target pixel of the base image based on one of the base image and the reference image; a synthetic ratio computation unit that computes a synthetic ratio between: the target pixel for a synthesis processing in the base image; and a corresponding pixel corresponding to the target pixel in the reference image processed by the motion compensation, in response to the contrast value of the target pixel; and a synthesizing unit that synthesizes the target pixel of the base image and the corresponding pixel of the reference image based on the synthetic ratio.

16 Claims, 8 Drawing Sheets

IMAGE PROCESSING DEVICE, IMAGE PROCESSING METHOD, PHOTOGRAPHIC IMAGING APPARATUS, AND RECORDING DEVICE RECORDING IMAGE PROCESSING PROGRAM

CROSS REFERENCE TO RELATED APPLICATIONS

This application is a continuation of International Patent Application No. PCT/JP2011/79170, filed on Dec. 16, 2011, which claims the benefit of Japanese Patent Application No. JP 2011-031119, filed on Feb. 16, 2011, which are incorporated by reference as if fully set forth.

TECHNICAL FIELD

The present invention relates to an image processing device, an image processing method, a photographic imaging apparatus, and a recording device recording an image processing program.

BACKGROUND ART

Known techniques for reducing an amount of noise of a moving image include a cyclic noise reduction technique. This technique performs motion compensation between an input frame image and a processed previous frame image, and computes reliability of the motion compensation related to each pixel based on differences from peripheral pixels. The input frame image (the current frame) and the previous frame image are blended and synthesized in a blending synthetic ratio (a mixing ratio) derived from a reliability, an amount of motion, and an estimated amount of noise (see Japanese Patent No. 4321626 and Japanese Patent Application Laid-open No. 2010-147986).

In recent years, a motion detection for each pixel by recording a moving image at high image quality and high frame rate increases the circuit size and the computation time. On the other hand, a motion compensation based on a motion detection with discrete points reduces the circuit size and the computation time. In this case, an error occurs in the motion detection. In a block matching method and similar method that allow a high-speed motion detection, an error occurs in a motion detection due to influences of, for example, lens distortion and rolling shutter. Additionally, an error occurs in a motion detection due to an influence of noise. Therefore, the known technique that reduces the amount of noise increases the synthetic ratio of the previous frame image as the reliability of the motion compensation becomes higher, and reduces the synthetic ratio of the previous frame image as the reliability of the motion compensation becomes lower, so as to prevent occurrence of image lag and artifact during the blend synthesis. It should be noted that the reliability of the motion compensation can be computed from an evaluation value for dissimilarity, for example, the sum of absolute difference (SAD) between the images processed by the motion compensation. The reliability increases as the sum of absolute difference becomes smaller, and decreases as the sum of absolute difference becomes larger.

SUMMARY OF INVENTION

According to an embodiment of the present invention, there is provided an image processing device for performing synthesis processing with a base image and at least one reference image to generate a synthetic image with a small amount of noise at least compared with the base image. The image processing device includes: a motion-vector computation unit that computes a motion vector between the base image and the reference image; a motion compensation unit that performs a motion compensation to align the reference image with the base image based on the motion vector; a contrast computation unit that computes a contrast value of a target pixel for the synthesis processing in the base image based on one of the base image and the reference image; a synthetic ratio computation unit that computes a synthetic ratio between: the target pixel of the base image; and a corresponding pixel corresponding to the target pixel in the reference image processed by the motion compensation, in response to the contrast value of the target pixel; and a synthesizing unit that synthesizes the target pixel of the base image and the corresponding pixel of the reference image based on the synthetic ratio.

According to another embodiment to the present invention, there is provided an image processing method for performing synthesis processing with a base image and at least one reference image to generate a synthetic image with a small amount of noise at least compared with the base image. The image processing method includes: computing a motion vector between the base image and the reference image; performing a motion compensation to align the reference image with the base image based on the motion vector; computing a contrast value of a target pixel for the synthesis processing in the base image based on one of the base image and the reference image; computing a synthetic ratio between: the target pixel of the base image; and a corresponding pixel corresponding to the target pixel in the reference image processed by the motion compensation, in response to the contrast value of the target pixel; and synthesizing the target pixel of the base image and the corresponding pixel of the reference image based on the synthetic ratio.

According to further another embodiment of the present invention, there is provided a computer-readable recording device having an image processing program coded and recorded thereon in a computer readable format, the image processing program performing synthesis processing with a base image and at least one reference image to generate a synthetic image with a small amount of noise at least compared with the base image, wherein the image processing program causes a computer to execute a method comprising: a motion-vector computation step of computing a motion vector between the base image and the reference image; a motion compensation step of performing a motion compensation to align the reference image with the base image based on the motion vector; a contrast computation step of computing a contrast value of a target pixel for the synthesis processing in the base image based on one of the base image and the reference image; a synthetic ratio computation step of computing a synthetic ratio between: the target pixel of the base image; and a corresponding pixel corresponding to the target pixel in the reference image processed by the motion compensation, corresponding to the contrast value of the target pixel; and a synthesizing unit step of synthesizing the target pixel of the base image and the corresponding pixel of the reference image based on the synthetic ratio.

The foregoing and additional features and characteristics of this disclosure will become more apparent from the following detailed description considered with the reference to the accompanying drawings.

DESCRIPTION OF EMBODIMENTS

First Embodiment

Figure 1:
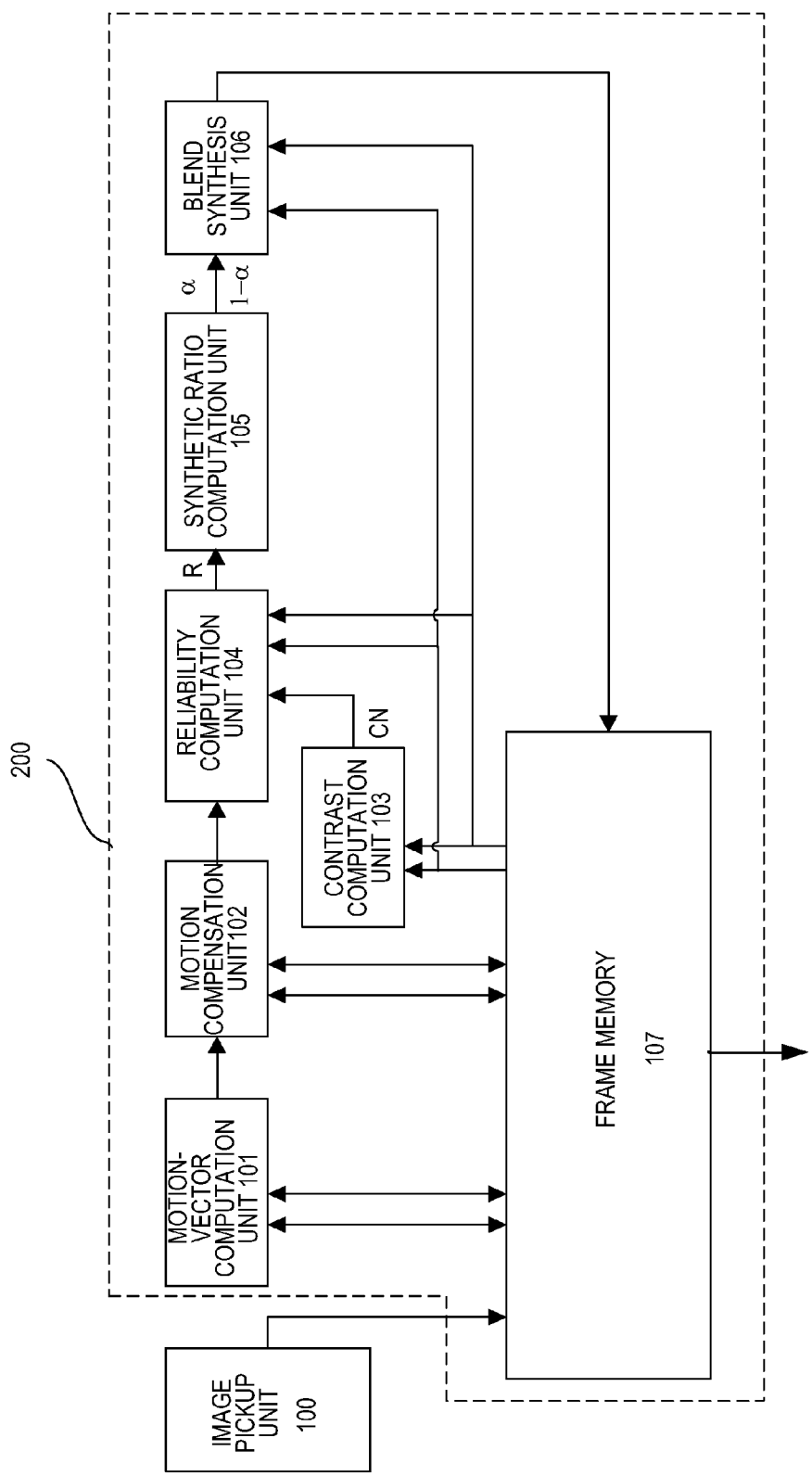
FIG. 1 is a block diagram illustrating an image processing device according to the present invention.

FIG. 1 illustrates a block configuration diagram of an image processing device according to a first embodiment. In this embodiment, the image processing device is mounted on a photographic imaging apparatus. The photographic imaging apparatus is described as an example of electronic equipment such as a video camera and an electronic still camera.

The photographic imaging apparatus includes an image pickup unit 100 and an image processing device 200. The image pickup unit 100 for shooting an image functions as an image input unit for inputting an image (image data) to the image processing device 200. The image processing device 200 outputs a noise-reduced image to the outside.

The image pickup unit 100 includes an imaging optical system, an imaging element, an A/D converter circuit. The image processing device 200 includes a motion-vector computation unit 101 (motion-vector computation means), a motion compensation unit 102 (motion compensation means), a contrast computation unit 103 (contrast computation means), a reliability computation unit 104 (reliability computation means), a synthetic ratio computation unit 105 (synthetic ratio computation means), and a blend synthesis unit 106 (blend synthesis means). It should be noted that each unit (or all the units) of the image processing device 200 described above may be constituted of a logic circuit such as an ASIC and an FPGA. Alternatively, each unit (or all the units) of the image processing device 200 described above may be constituted of, for example, a memory for storing data, a memory for storing a calculation program, and a central processing unit/a digital signal processor (CPU/DSP) for executing this calculation program.

Additionally, the image processing device 200 includes a frame memory 107 (a storage unit). The frame memory 107 stores a current frame image that is shot and output to the frame memory 107 by the image pickup unit 100 and a previous frame image output from the blend synthesis unit 106 as pixel value data.

The previous frame image and the current frame image stored in the frame memory 107 are input to the motion-vector computation unit 101, and respectively used as a reference image and a base image (standard image). Here, the "previous frame image" is an image that is output from the blend synthesis unit 106 and stored in the frame memory 107 in the previous process of the image processing device 200. The "current frame image" is an image (an image before synthesis) that is shot by the image pickup unit 100 and targeted for blend synthesis in the current process of the image processing device 200.

The motion-vector computation unit 101 computes a motion vector between two input frame images using a template matching method or similar method, and outputs the motion vector to the motion compensation unit 102. The motion compensation unit 102 compensates the motion (the positional deviation) such that the previous frame image as the reference image is aligned with the current frame image as the base image. Additionally, the motion compensation unit 102 cuts out a small area of the current frame image and a small area of the previous frame image aligned with the current frame image. The small areas of the previous frame image and the small area of the current frame image are associated with each other, and respectively referred to also as a reference area and a base area. The motion compensation unit 102 determines a cut-out position of the small area of the previous frame image based on the motion vector so as to cancel the motion vector. The small area is an area that includes a target pixel targeted for the blend synthesis at the center and is a smaller area with a predetermined size compared with the entire image, for example, an area of 3×3 pixels or 5×5 pixels.

The frame memory 107 stores pixel value data of the small area of the current frame image (the base image) and the small area of the previous frame image (the reference image). The pixel value data is input to the contrast computation unit 103. The contrast computation unit 103 computes a contrast value CN of the target pixel targeted for blend synthesis, and outputs the contrast value CN to the reliability computation unit 104.

The reliability computation unit 104 computes dissimilarity (such as the Sum of Absolute Difference (SAD)) or similarity (such as the Normalized Cross-Correlation (NCC)) between the small area of the current frame image and the small area of the previous frame image. Additionally, the reliability computation unit 104 corrects this dissimilarity or similarity in response to the contrast value CN. Furthermore, the reliability computation unit 104 computes a reliability R (that is, a reliability R of the motion vector) of the motion compensation based on the corrected dissimilarity or similarity, and outputs the reliability R to the synthetic ratio computation unit 105. It should be noted that the similarity becomes smaller as the dissimilarity becomes larger.

The synthetic ratio computation unit 105 computes a blending synthetic ratio of the target pixel (the center pixel of the small area) of the current frame image and the corresponding pixel corresponding to the target pixel in the previous frame image, based on the input reliability R. The synthetic ratio computation unit 105 outputs the blending synthetic ratio to the blend synthesis unit 106. In the case where the synthetic ratio of the corresponding pixel of the previous frame image is assumed to be a, the synthetic ratio of the target pixel of the current frame image becomes (1−α). The blend synthesis unit 106 blends and synthesizes the target pixel and the corresponding pixel at the calculated synthetic ratio as the synthesis processing. The blend synthesis unit 106 outputs the result of the synthesis processing to the frame memory 107 for storage. As the blend synthesis, a weighted addition or a weighted average is performed using the synthetic ratio of the target pixel and the corresponding pixel as a weight.

Subsequently, the blend synthesis is performed on all target pixels (that is, all pixels of the current frame image). The synthetic image in the frame memory 107 is then output to a recording medium (a memory card) or similar medium and recorded, or output to a display unit (such as an LCD monitor) and displayed.

Figure 2:
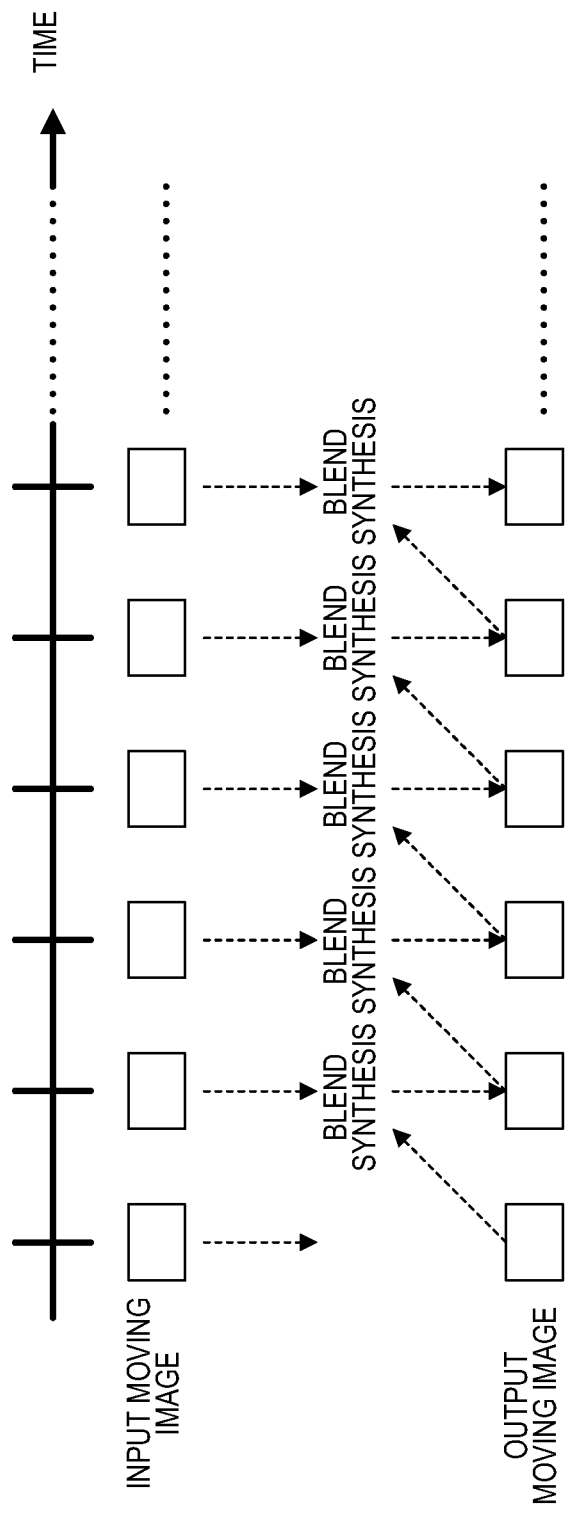
FIG. 2 is a sequence diagram illustrating a blend synthesis processing according to the present invention.

FIG. 2 illustrates a process sequence diagram according to the first embodiment. During moving image shooting where a plurality of images is shot continuously, a first input image is directly used as an output image. When a second input image is shot, the stored first output image (the previous frame image) and the second input image (the current frame image) are blended and synthesized to generate a synthetic image. This synthetic image is used as a second output image. As illustrated in FIG. 2, blend synthesis is performed after third input image similarly to the second input image.

A description will be given of a method for computing a contrast in the contrast computation unit 103. For example, the contrast computation unit 103 obtains an average value of luminance within the small area including the target pixel among the luminances in the current frame image, and computes a difference amount (an absolute value of the difference) between the average value and a luminance of each pixel within the small area. The maximum difference amount is set to be a contrast value CN with respect to the target pixel. Alternatively, for example, the contrast computation unit 103 may set the difference between the lowest luminance and the highest luminance within the small area including the target pixel among the luminances in the current frame image as the contrast value CN with respect to the target pixel. In these two cases, the contrast value CN may take a value in a range from 0 to 255.

Furthermore, for example, the contrast computation unit 103 may set the contrast value CN with respect to the target pixel as follows. In the small area including the target pixel in the current frame image, filtering is performed on each pixel with a filter (such as a differential filter, the Sobel filter, and the Laplacian filter) for extracting edges. A sum of the edge amounts within the small area is normalized as the contrast value CN. In this case, the normalization may be performed to have a value in a range from 0 to 255 on the same scale of a contrast value CN generated by another method.

It should be noted that the luminance of the current frame image is used in the above-described three methods for computing the contrast. However, a value that indicates a brightness of the pixel may be used. For example, a pixel value of G among the three primary colors RGB may be used. While the contrast value is computed from the current frame image, the contrast value may be computed using the small area including the corresponding pixel of the previous frame image. This is because the corresponding pixel of the previous frame image is specified by the motion compensation. The corresponding pixel has a position corresponding to a position of the target pixel of the current frame image (the base image) by the motion compensation.

Figure 3:
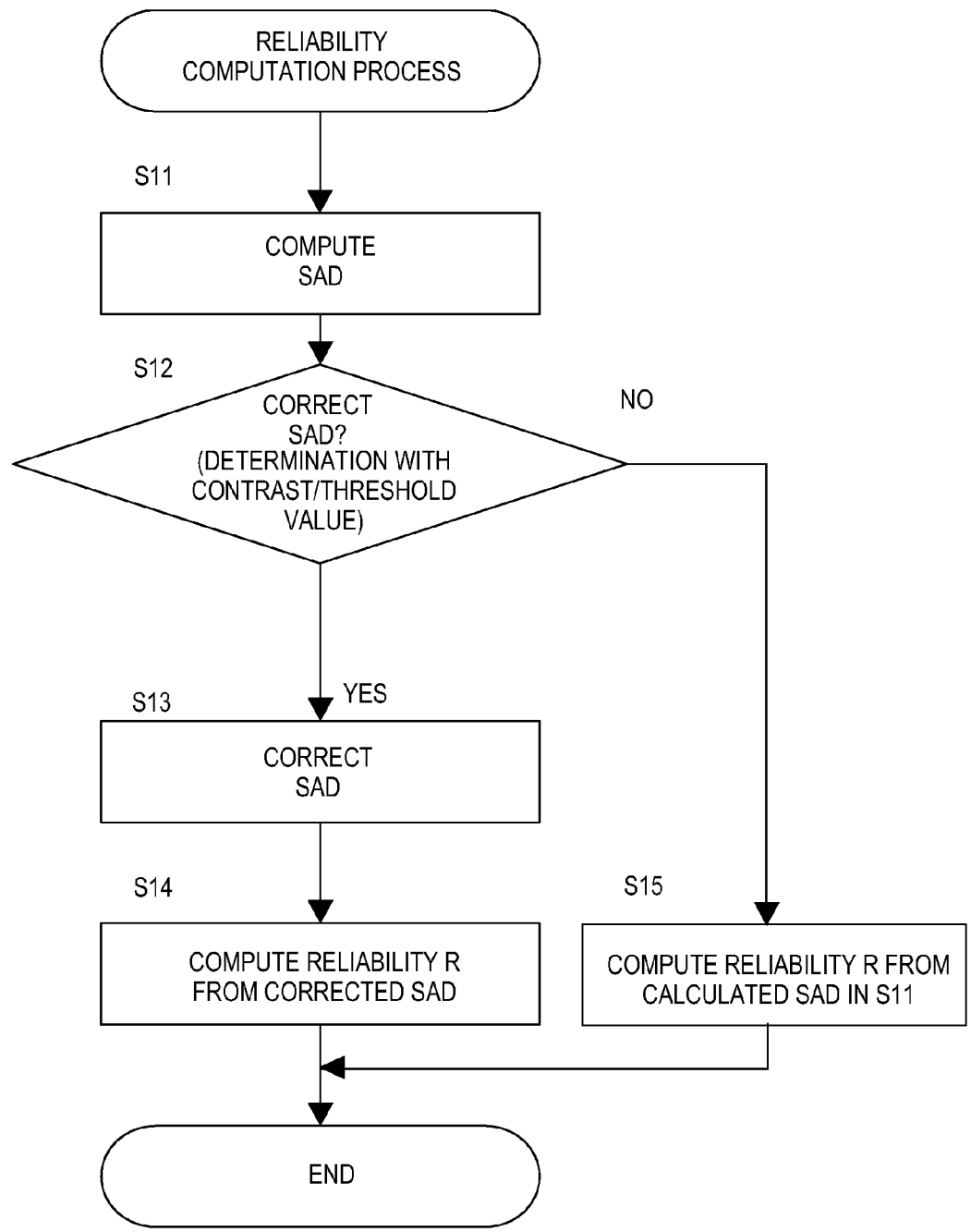
FIG. 3 is a flowchart illustrating a procedure of a reliability computation process according to a first embodiment.

A flowchart of FIG. 3 illustrates a procedure of a reliability computation process executed by the reliability computation unit 104. In the flow chart, a number with S denotes a step number.

First, in S11, the reliability computation unit 104 reads the pixel value data of the small area of the current frame image and the pixel value data of the small area of the previous frame image that is extracted by alignment from the frame memory 107. Subsequently, the reliability computation unit 104 computes the sum of absolute difference (SAD) as dissimilarity between both the small areas. Instead, the reliability computation unit 104 may compute the sum of squared difference (SSD) of the pixel values as dissimilarity and the normalized cross-correlation (NCC) as similarity.

In S12, the reliability computation unit 104 compares the contrast value CN with a first threshold value $TH_1$ to determine whether or not the SAD (that is, the dissimilarity) needs to be corrected based on the comparison result. In case where the contrast value CN is equal to or less than the first threshold value $TH_1$, the SAD does not need to be corrected. In the case where the contrast value CN is larger the first threshold value $TH_1$, the SAD needs to be corrected. In the case where the SAD needs to be corrected, the routine advances to S13 and S14. In the case where the case where the SAD does not need to be corrected, the routine advances to S15. In S13, the reliability computation unit 104 corrects the SAD (the dissimilarity) in response the contrast value CN. The correcting method will be described later.

In S14, the reliability computation unit 104 computes the reliability R of the motion compensation based on the corrected SAD (the SAD after the correction). In S15, the reliability computation unit 104 computes the reliability R of the motion compensation based on the SAD (the SAD calculated in S11) that is not corrected. It should be noted that in the case where the SAD and the SSD are used as the dissimilarity, the reliability R is computed such that the reliability R becomes higher as the dissimilarity becomes smaller and becomes lower as the dissimilarity becomes larger. For example, the reliability R can be calculated using a function where the value becomes smaller as the dissimilarity becomes larger. It should be noted that in the case where the normalized cross-correlation (NCC) is used as the similarity, the reliability computation unit 104 computes the reliability R that becomes higher as the similarity becomes larger and becomes lower as the similarity becomes smaller.

Thus, the reliability computation unit 104 computes the reliability R in response to the contrast of the target pixel by the reliability computation process from S11 to S14. Therefore, the synthetic ratio computation unit 105 calculates the synthetic ratio in response to the reliability R, thus obtaining the synthetic ratio based on the contrast of the target pixel.

A method for correcting the SAD (the dissimilarity) will be described in conjunction with FIGS. 4A to 4C. For example, a gain value GN is calculated in response to the contrast value CN. A value obtained by multiplying the SAD calculated in S11 by the gain value as a correction amount may be the corrected SAD (the SAD after the correction). Alternatively, an offset value VF is calculated in response to the contrast value CN. A value obtained by subtracting the offset value as a correction amount from the SAD calculated in S11 may be the corrected SAD (the SAD after the correction). It should be noted that in the case where the reliability computation unit 104 computes the reliability R of the motion compensation based on the corrected NCC (the NCC after the correction), a value obtained by dividing the NCC calculated in S11 by the gain value or a value obtained by adding the offset value to the NCC calculated in S11 may be the corrected NCC (the NCC after the correction).

Figure 4A:
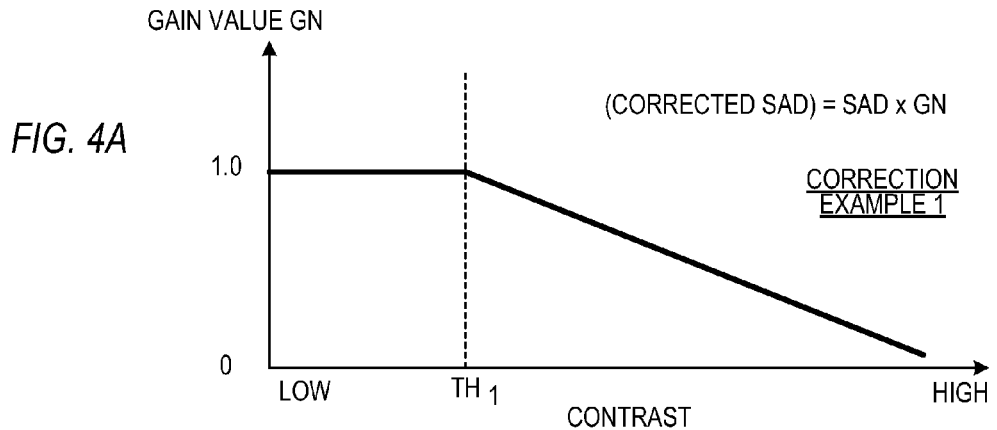
FIG. 4A is a graph illustrating an exemplary method for correcting dissimilarity.

In Correction example 1 of FIG. 4A, the SAD is corrected by multiplication of the gain value. In the case where the contrast value CN is equal to or less than the first threshold value $TH_1$, the gain value is a value (the first correction amount) independent from the contrast value. In this embodiment, the gain value of 1.0 is equivalent to no correction. In the case where the contrast value CN is larger than the first threshold value $TH_1$, the gain value becomes smaller as the contrast value CN becomes higher. As illustrated in FIG. 4A, the gain value is determined based on the contrast value by a function, a map, or a table for associating the gain value with the contrast value. The value obtained by multiplying the SAD calculated in S11 by the gain value is set to the SAD after the correction.

Figure 4B:
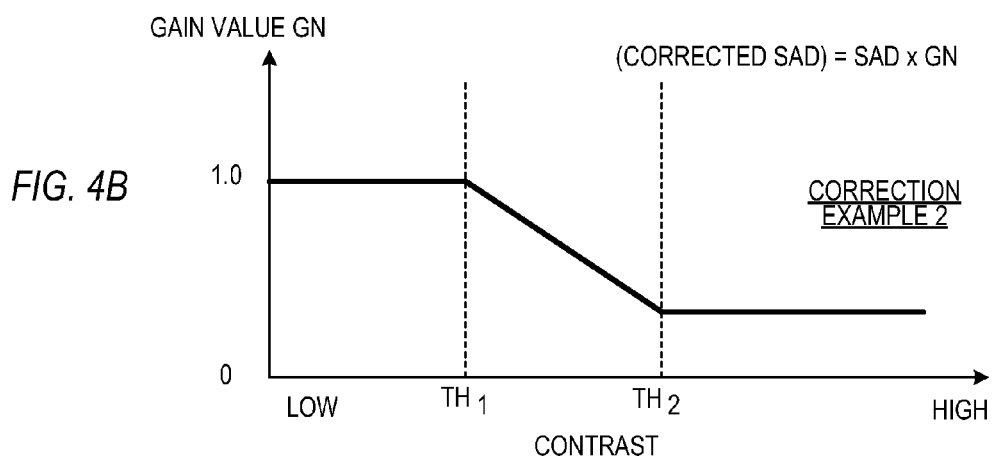
FIG. 4B is a graph illustrating another exemplary method for correcting dissimilarity.

In Correction example 2 of FIG. 4B, the SAD is corrected by multiplication of the gain value. In the case where the contrast value CN is equal to or less than a first threshold value $TH_1$, the gain value is a value (the first correction amount) independent from the contrast value. In this embodiment, the gain value of 1.0 is equivalent to no correction. In the case where the contrast value CN is in a range from the first threshold value $TH_1$ to a second threshold value $TH_2$, the gain value becomes smaller as the contrast value CN becomes higher. In the case where the contrast value CN is equal to or more than the second threshold value $TH_2$, the gain value is a constant value (a second correction amount) independent from the contrast value. As illustrated in FIG. 4B, the gain value is determined based on the contrast value by a function, a map, or a table for associating the gain value with the contrast value. The value obtained by multiplying the SAD calculated in S11 by the gain value is set to the SAD after the correction.

Figure 4C:
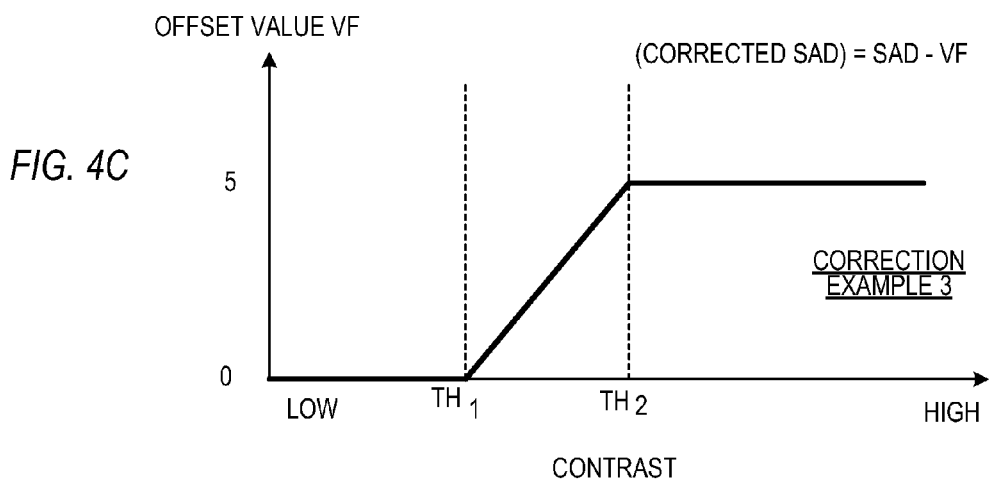
FIG. 4C is a graph illustrating another exemplary method for correcting dissimilarity.

In Correction example 3 of FIG. 4C, the SAD is corrected by subtraction of the offset value. In the case where the contrast value CN is equal to or less than the first threshold value $TH_1$, the offset value is a value (the first correction amount) independent from the contrast value. In this embodiment, the contrast value is zero. This is equivalent to no correction. In the case where the contrast value CN is in a range from the first threshold value $TH_1$ to the second threshold value $TH_2$, the offset value becomes larger as the contrast becomes higher. In the case where the contrast value CN is equal to or more than the second threshold value $TH_2$, the offset value is a constant value (the second correction amount) independent from the contrast value. As illustrated in FIG. 4C, the offset value is determined based on the contrast value by a function, a map, or a table for associating the offset value with the contrast value. The value obtained by subtracting the offset value from the SAD calculated in S11 is set to the SAD after the correction.

It should be noted that even in the case where correction is performed with the contrast value CN equal to or less than the first threshold value $TH_1$ (that is, in the case where the gain value is not 1.0 or in the case where the offset value is not zero), the steps of S12 and S15 are skipped. In each of Correction examples 1 to 3, the first threshold value $TH_1$ may have a different value. In each of correction examples 2 and 3, the second threshold value $TH_2$ may have a different value.

Figure 5:
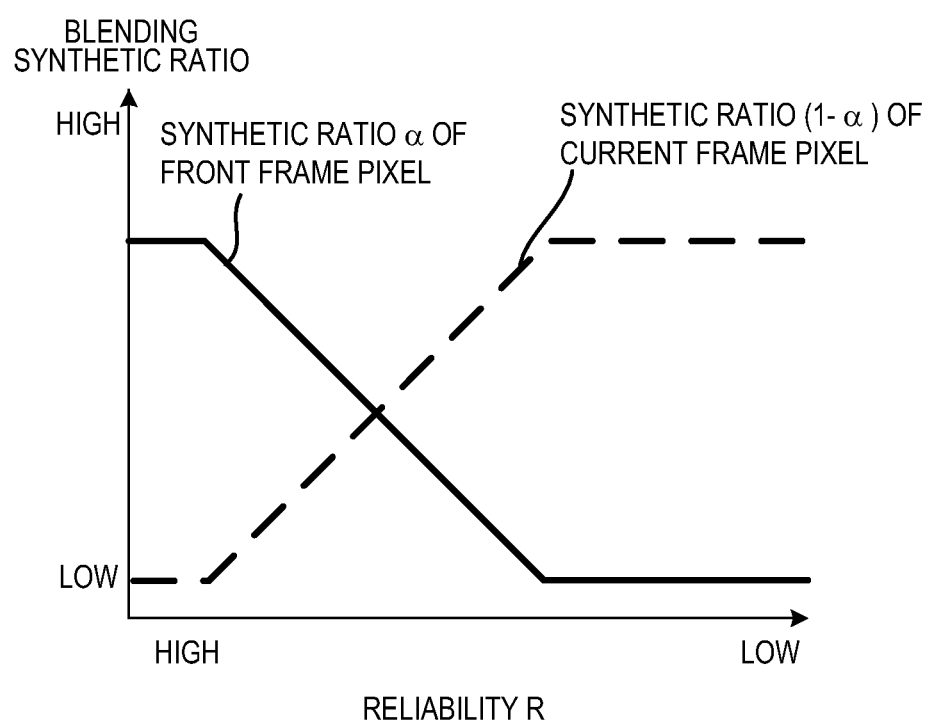
FIG. 5 is a graph illustrating a relationship between a reliability R of a motion compensation and a blending synthetic ratio.

FIG. 5 illustrates a relationship between the reliability R and the blending synthetic ratio. As illustrated in FIG. 5, the synthetic ratio computation unit 105 determines the synthetic ratio α of the corresponding pixel of the previous frame image and the synthetic ratio (1−α) of the target pixel of the current frame image based on the reliability R. As illustrated by the solid line in FIG. 5, the synthetic ratio α of the previous frame image becomes smaller as the reliability R becomes lower. As illustrated by the dashed line in FIG. 5, the synthetic ratio (1−α) of the current frame image becomes larger as the reliability R becomes lower. The blend synthesis unit 106 blends and synthesizes the target pixel of the current frame image and the corresponding pixel of the previous frame image at the determined synthetic ratio. The blend synthesis unit 106 sets an image where all pixels of the current frame image are processed by image processing up to the blend synthesis as an output image with respect to the current frame image. The frame memory 107 stores this output image as previous frame image used in the next frame processing.

It should be noted that in the first embodiment described above, the reliability computation unit 104 computes the reliability R based on to the contrast of the target pixel. Therefore, the synthetic ratio computation unit 105, which computes the synthetic ratio from the reliability R, can indirectly compute the synthetic ratio in response to the contrast of the target pixel. Alternatively, the reliability computation unit 104 may compute the reliability R independently of the contrast without correction of the SAD. The synthetic ratio computation unit 105 may compute the synthetic ratio from the reliability R. Subsequently, the synthetic ratio may be corrected directly in response to the contrast value CN. Further, the synthetic ratio may be obtained not for each pixel but for each area of the image.

(Operation and Advantageous Effects)

Next, operation and advantageous effects of the first embodiment will be described. The contrast computation unit 103 computes the contrast value of the target pixel targeted for the synthesis processing in the base image (the current frame image) from the base image or the reference image (the previous frame image). The synthetic ratio computation unit 105 computes the synthetic ratio of the target pixel of the base image and the corresponding pixel corresponding to the target pixel in the reference image processed by the motion compensation, in response to the contrast value of the target pixel. The blend synthesis unit 106 blends and synthesizes the target pixel of the base image and the corresponding pixel of the reference image based on the computed synthetic ratio. This prevents a situation where an influence of a motion compensation error on the synthetic ratio differs depending on the contrast. This avoids sway of the moving image in a motion detection accuracy where the motion compensation error is generated, and reduces the amount of noise at least compared with the base image.

The reliability computation unit 104 computes the reliability of the motion compensation for the target pixel in response to the contrast value of the target pixel. The synthetic ratio computation unit 105 computes the synthetic ratio in response to the reliability. Accordingly, use of the reliability of the motion compensation in response to the contrast value appropriately prevents a situation where the influence of the motion compensation error on the synthetic ratio differs depending on the contrast. For example, in the case where the reliability is low, this improves the image quality of the image output from the image processing device by reducing the synthetic ratio of the corresponding pixel of the reference image (the previous frame image).

The reliability computation unit 104 computes dissimilarity or similarity between the base area including the target pixel of the base image and the reference area corresponding to the base area within the reference image processed by the motion compensation, so as to perform correction as follows. The computed dissimilarity is reduced or the computed similarity is increased in response to the contrast value of the target pixel. The reliability computation unit 104 calculates the reliability such that the reliability becomes higher as the corrected dissimilarity becomes smaller or the corrected similarity becomes larger. In the case of the high contrast, the dissimilarity or the similarity becomes sensitive to the motion compensation error. However, the reliability is obtained based on the dissimilarity or the similarity corrected in response to the contrast value. This prevents the motion compensation error from considerably affecting the synthetic ratio in a high-contrast area of the image.

In the case where the contrast value of the target pixel is higher than the first threshold value $TH_1$, the reliability computation unit 104 may perform correction such that the dissimilarity is reduced or the similarity is increased as the contrast value becomes higher. This appropriately prevents the motion compensation error from considerably affecting the synthetic ratio in the high-contrast area of the image. In the case where the contrast value of the target pixel is equal to or more than the second threshold value $TH_2$, which is larger than the first threshold value, the dissimilarity or the similarity may be corrected with the correction amount independent from the contrast value. This prevents excessively high synthetic ratio α of the reference image (the previous frame image) by excessive reduction of the dissimilarity (by excessive increase of the similarity) in the high-contrast area of the image.

Second Embodiment

Figures 6, 7:
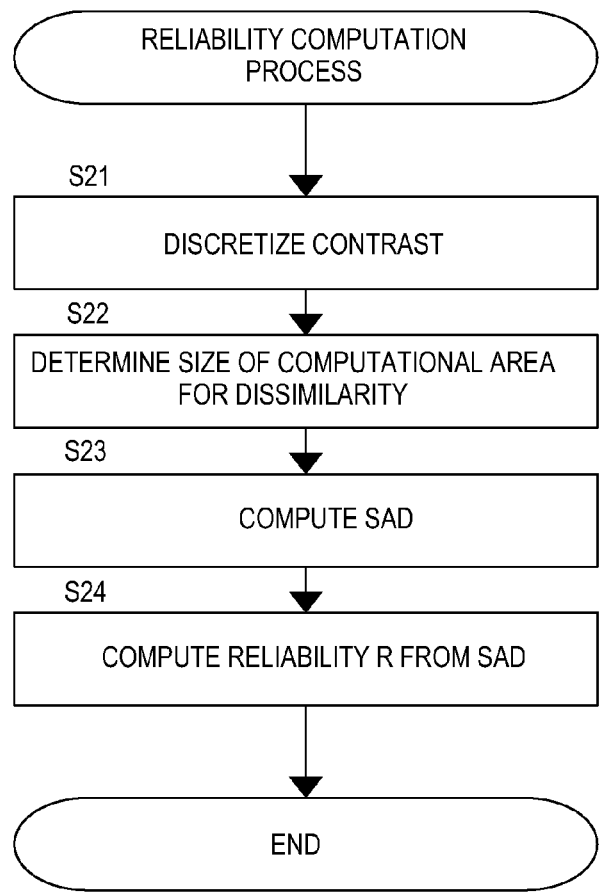
FIG. 6 is a flowchart illustrating a procedure of a reliability computation process according to a second embodiment.
FIG. 7 is an exemplary table for associating a contrast value with a size of a computational area of dissimilarity according to the second embodiment.

A flowchart in FIG. 6 illustrates a procedure of the reliability computation process executed by the reliability computation unit 104 according to a second embodiment. The configuration other than the reliability computation process is similar to the configuration of the first embodiment, and is not explained in order to avoid duplications of descriptions. In the first embodiment, the reliability computation unit 104 computes the dissimilarity (such as the SAD) (or similarity) between the small area of the current frame image and the small area of the previous frame image, and corrects the computed dissimilarity (or similarity) based on the contrast value. On the other hand, in the second embodiment, the reliability computation unit 104 does not correct the computed dissimilarity (or similarity), but changes a size of a computational area (the small area) for computing the dissimilarity (or similarity) in response to the contrast value. The computational area is an area that has the target pixel at the center. The reliability computation unit 104 cuts out a computational area (the base area) for dissimilarity of the current frame image (the base image) and a computational area (the reference area) for dissimilarity of the previous frame image (the reference image) to compute the dissimilarity (or similarity). Both the computational areas correspond to each other by the motion compensation.

In S21, the reliability computation unit 104 discretizes the contrast value CN computed by the contrast computation unit 103. For example, the reliability computation unit 104 may divide the contrast value by a constant value and round the division down (or up) to the nearest whole number so as to set the rounded value as the discretized contrast value. For example, in the case where the contrast value has a range from 0 to 255, the contrast value is divided by a constant value of 64. Alternatively, the reliability computation unit 104 may perform discretization by division with a constant value only in the case of the contrast value within a certain range and perform different discretization while associating respective constant values in the case where the contrast value is a value equal to or less than the range and in the case where the contrast value is a value equal to or more than the range.

In S22, the reliability computation unit 104 determines the size of the computational area for computing the dissimilarity corresponding to the discretized contrast value. Accordingly, one size of the computational area corresponds to a range of the original contrast values before the discretization. The size of the computational area for dissimilarity becomes larger as the contrast value becomes higher. It should be noted that a method for determining the size of the computational area will be described later.

In S23, the reliability computation unit 104 computes the sum of absolute difference (SAD) of the pixel values as the dissimilarity between the respective computational areas of the current frame image and the previous frame image. Instead, the reliability computation unit 104 may compute the sum of squared difference (SSD) of the pixel values as the dissimilarity and compute the normalized cross-correlation (NCC) as the similarity.

In S24, the reliability computation unit 104 computes the reliability R from the computed SAD. It should be noted that since the SAD as a sum is likely to become a larger value as the size of the computational area becomes larger, the reliability R may be computed from a value obtained by dividing the SAD by the number of pixels in the computational area. In the case where the dissimilarity is estimated by the SAD and the SSD, the reliability R is computed to be higher as the dissimilarity becomes smaller and to be lower as the dissimilarity becomes larger. The reliability computation unit 104 computes the reliability R in response to the contrast of the target pixel. Therefore, the synthetic ratio computation unit 105, which computes the synthetic ratio from the reliability R, can indirectly compute the synthetic ratio in response to the contrast of the target pixel.

FIG. 7 illustrates an exemplary table for associating the discretized contrast value with the size of the computational area for dissimilarity (or similarity). FIG. 7 illustrates an example where the discretized contrast takes 0 to 3. The size of the computational area for dissimilarity (or similarity) becomes larger as the contrast value becomes higher. The reliability computation unit 104 refers to this table to determine the size of the computational area. In the case where the discretized contrast is 0, 1, 2, or 3, the size of the computational area for dissimilarity (or similarity) becomes an area of 3×3 pixels, 5×5 pixels, 7×7 pixels, or 9×9 pixels.

According to the second embodiment, as the contrast value of the target pixel becomes higher, the reliability computation unit 104 sets larger sizes of: the base area (the computational area of the base image) including the target pixel of the base image; and the reference area (the computational area of the reference image) corresponding to the base area within the reference image processed by the motion compensation, and computes the dissimilarity (or similarity) between the base area and the reference area. Therefore, even in the case where the noise and the motion compensation error occur at an acceptable level, this prevents extremely high dissimilarity such as the SAD (and extremely low similarity) in a portion of the image with a high contrast value. This reduces the influence of the motion compensation error on the dissimilarity (or similarity) in the portion of the image with a high contrast value, and eventually with respect to the synthetic ratio computed from the reliability.

Third Embodiment

Figures 8, 9:
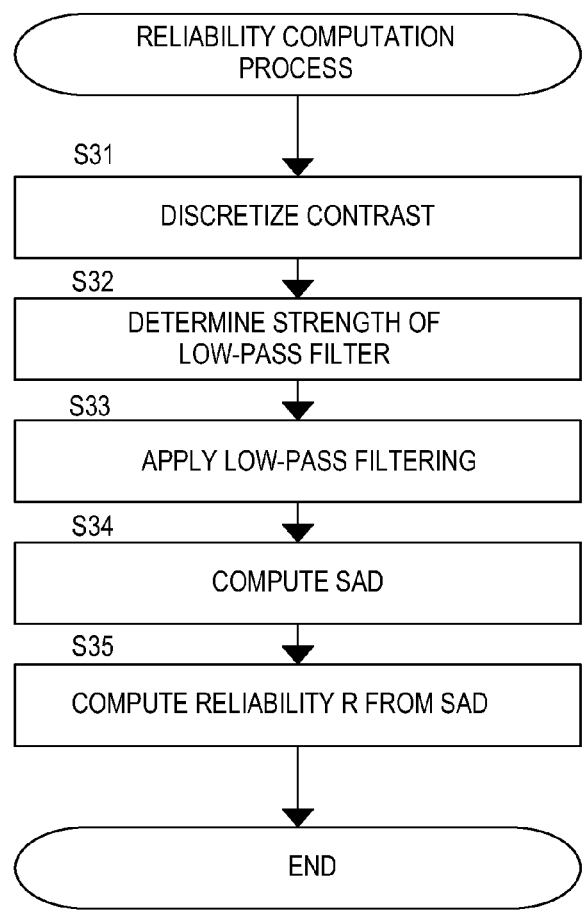
FIG. 8 is a flowchart illustrating a procedure of a reliability computation process according to a third embodiment.
FIG. 9 is an exemplary table for associating a contrast value with a strength of a low-pass filter according to the third embodiment.

A flowchart in FIG. 8 illustrates a procedure of the reliability computation process executed by the reliability computation unit 104 according to a third embodiment. The configuration other than the reliability computation process is similar to the configuration of the first embodiment, and is not explained in order to avoid duplications of descriptions. In the first embodiment, the reliability computation unit 104 computes the dissimilarity (such as the SAD) (or similarity) between the small area of the current frame image and the small area of the previous frame image, and corrects the computed dissimilarity (or similarity) based on the contrast value. However, in the third embodiment, the reliability computation unit 104 does not correct the computed dissimilarity (or similarity), but filters a computational area (the base area) for dissimilarity of the current frame image (the base image) and a computational area (the reference area) for dissimilarity of the previous frame image (the reference image) using a low-pass filter for removing high spatial-frequency components before computing the dissimilarity (or similarity). The strength of the low-pass filter for filtering both the computational areas is changed in response to the contrast value.

In S31, the reliability computation unit 104 discretizes the contrast value CN computed by the contrast computation unit 103 similarly to S21. In S32, the reliability computation unit 104 determines the strength of the low-pass filter for filtering the computational area for dissimilarity based on the discretized contrast value. Accordingly, one strength of the low-pass filter corresponds to a certain range of the original contrast values before the discretization.

In S33, the reliability computation unit 104 performs filtering on the respective computational areas of the previous frame image and the current frame image with the determined strength of the low-pass filter. In S34, the reliability computation unit 104 computes the sum of absolute difference (SAD) of the pixel values as the dissimilarity between the respective computational areas of the current frame image and the previous frame image after filtering. Instead, the reliability computation unit 104 may compute the sum of squared difference (SSD) of the pixel values as the dissimilarity and compute the normalized cross-correlation (NCC) as the similarity.

In S35, the reliability computation unit 104 computes the reliability R from the computed SAD. In the case where the dissimilarity is estimated by the SAD and the SSD, the reliability R is computed to be higher as the dissimilarity becomes smaller and to be lower as the dissimilarity becomes larger. The reliability computation unit 104 computes the reliability R in response to the contrast of the target pixel. Therefore, the synthetic ratio computation unit 105, which computes the synthetic ratio from the reliability R, can indirectly compute the synthetic ratio in response to the contrast of the target pixel.

FIG. 9 illustrates an exemplary table for associating the discretized contrast value with the strength of the low-pass filter. FIG. 9 illustrates an example where the discretized contrast takes 0 to 3. The strength of the low-pass filter becomes larger as the contrast becomes higher. The reliability computation unit 104 refers to this table to determine the strength of the low-pass filter. In the case where the discretized contrast is 0, the low-pass filter process is not performed. In the case where the discretized contrast is 1, the strength of the low-pass filter is low. In the case where the discretized contrast is 2, the strength of the low-pass filter is medium. In the case where the discretized contrast is 3, the strength of the low-pass filter is high.

According to the third embodiment, the reliability computation unit 104 filters: the base area (the computational area of the base image) including the target pixel of the base image; and the reference area (the computational area of the reference image) corresponding to the base area within the reference image processed by the motion compensation using the low-pass filter, and computes the dissimilarity (or similarity) between the base area and the reference area after filtering with the low-pass filter. Therefore, even in the case where the noise and the motion compensation error occur at an acceptable level, setting a higher strength of the low-pass filter as the contrast value becomes higher prevents extremely high dissimilarity such as the SAD (and extremely low similarity). This reduces the influence of the motion compensation error on the dissimilarity (or similarity), and eventually on the synthetic ratio computed form the reliability. Additionally, this configuration changes the strength of the low-pass filter, thus facilitating the implementation.

Other Embodiments

Although it is premised that the image processing device is processed by hardware in the respective embodiments mentioned above, the image processing device is not necessarily processed by such a configuration. For example, a configuration is also possible where processing is performed by software in a different manner. In this case, the image processing device corresponds to a computer, and includes a CPU, a main memory such as a RAM that stores image data, and a computer-readable recording device (or a non-transitory storage medium) on which a program for realizing all or part of the above mentioned image processing is encoded in a computer-readable format and stored. Here, this program is called an image processing program. The CPU reads out the image processing program stored on the above-mentioned storage medium and performs image data processing and computing processing, realizing similar processing to that of the above mentioned image processing device.

Here, the computer-readable recording device (or a non-transitory storage medium) refers to a magnetic disk, a magneto-optical disk, a CD-ROM, a DVD-ROM, a semiconductor memory, and similar recording device. This image processing program may be distributed to a computer through a communication line and the computer receiving this distribution may execute the image processing program.

Figure 10:
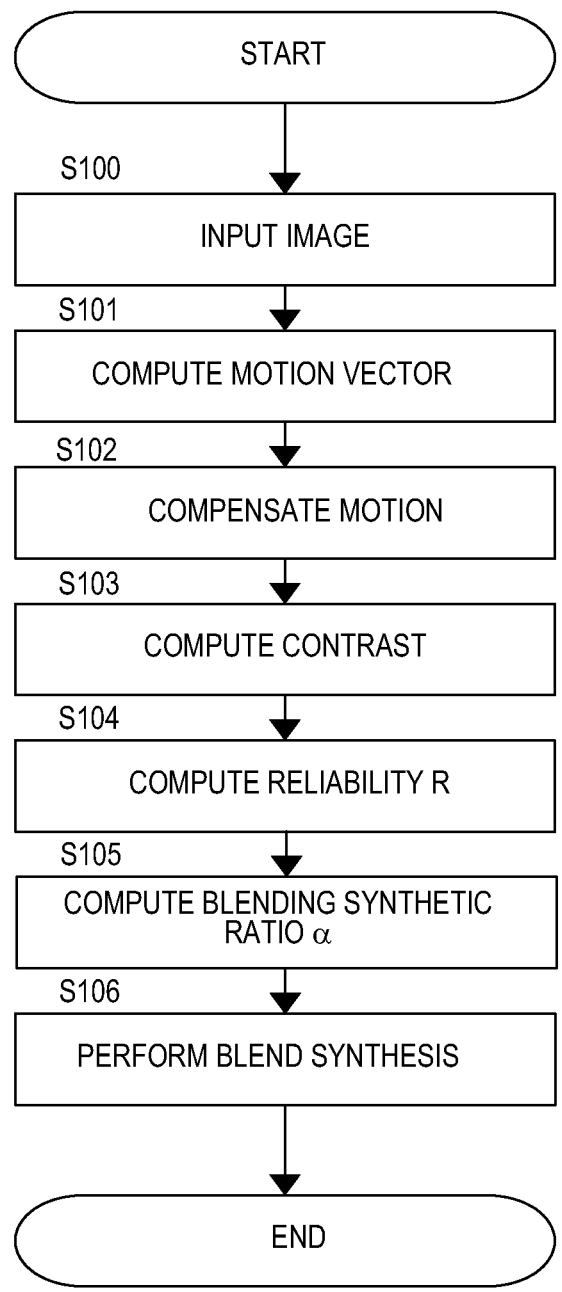
FIG. 10 is a flowchart exemplarily illustrating a procedure of an image processing program.

A flowchart in FIG. 10 illustrates an exemplary image processing program executed by the image processing device (the computer). In step S100, the image processing device reads image data (each frame of a moving image) recorded in the recording medium such as a memory card. The processes performed in steps S101 to S106 of FIG. 10 correspond to respective processes performed by the units 101 to 106 of FIG. 1.

While embodiments of the present invention have been described, the present invention may be variously changed or modified without departing from the scope or spirit of the present invention. Those skilled in the art would appreciate that such changes and modifications are incorporated into the scope of the invention and equivalents thereof as apparent from the appended claims.

What is claimed is:

1. An image processing device for performing synthesis processing with a base image and at least one reference image to generate a synthetic image with a smaller amount of noise than the base image, the image processing device comprising:
   a motion-vector computation unit that computes a motion vector between the base image and the reference image;
   a motion compensation unit that performs a motion compensation to align the reference image with the base image based on the motion vector;
   a contrast computation unit that computes a contrast value of a target pixel for the synthesis processing in the base image based on one of the base image and the reference image;
   a synthetic ratio computation unit that computes a synthetic ratio between the target pixel of the base image and a corresponding pixel corresponding to the target pixel in the reference image processed by the motion compensation, in response to the contrast value computed by the contrast computation unit of the target pixel; and a synthesizing unit that synthesizes the target pixel of the base image and the corresponding pixel of the reference image based on the synthetic ratio;

wherein the contrast computation unit, within an area including the target pixel, computes a maximum value of a difference between an average value of one of luminance and brightness within the area, and one of luminance and brightness of each pixel, as the contrast value of the target pixel.

2. A photographic imaging apparatus comprising the image processing device according to claim 1.

3. An image processing device for performing synthesis processing with a base image and at least one reference image to generate a synthetic image with a smaller amount of noise than the base image, the image processing device comprising:
   a motion-vector computation unit that computes a motion vector between the base image and the reference image;
   a motion compensation unit that performs a motion compensation to align the reference image with the base image based on the motion vector;
   a contrast computation unit that computes a contrast value of a target pixel for the synthesis processing in the base image based on one of the base image and the reference image;
   a synthetic ratio computation unit that computes a synthetic ratio between the target pixel of the base image and a corresponding pixel corresponding to the target pixel in the reference image processed by the motion compensation, in response to the contrast value computed by the contrast computation unit of the target pixel;
   a synthesizing unit that synthesizes the target pixel of the base image and the corresponding pixel of the reference image based on the synthetic ratio; and
   a reliability computation unit that computes a reliability of the motion compensation for the target pixel in response to the contrast value computed by the contrast computation unit of the target pixel;
   wherein the synthetic ratio computation unit computes the synthetic ratio in response to the reliability computed by the reliability computational unit; and
   wherein the reliability computation unit:
      computes one of a dissimilarity and a similarity between a base area including the target pixel of the base image, and a reference area corresponding to the base area within the reference image processed by the motion compensation;
      performs one of a correction to reduce the computed dissimilarity and a correction to increase the computed similarity, in response to the contrast value computed by the contrast computation unit of the target pixel;
      calculates the reliability such that the reliability becomes higher as the corrected dissimilarity becomes smaller or as the corrected similarity becomes larger;
      performs one of a correction such that the dissimilarity is reduced more or the similarity is increased more as the contrast value of the target pixel becomes higher, when the contrast value of the target pixel is within a range from a first threshold value to a second threshold value; and
      corrects one of the dissimilarity and the similarity with a second correction amount independent from the contrast value, when the contrast value of the target pixel is equal to or more than the second threshold value.

4. A photographic imaging apparatus comprising the image processing device according to claim 3.

5. An image processing device for performing synthesis processing with a base image and at least one reference image to generate a synthetic image with a smaller amount of noise than the base image, the image processing device comprising:
   a motion-vector computation unit that computes a motion vector between the base image and the reference image;
   a motion compensation unit that performs a motion compensation to align the reference image with the base image based on the motion vector;
   a contrast computation unit that computes a contrast value of a target pixel for the synthesis processing in the base image based on one of the base image and the reference image;
   a synthetic ratio computation unit that computes a synthetic ratio between the target pixel of the base image and a corresponding pixel corresponding to the target pixel in the reference image processed by the motion compensation, in response to the contrast value computed by the contrast computation unit of the target pixel;
   a synthesizing unit that synthesizes the target pixel of the base image and the corresponding pixel of the reference image based on the synthetic ratio; and
   a reliability computation unit that computes a reliability of the motion compensation for the target pixel in response to the contrast value computed by the contrast computation unit of the target pixel;
   wherein the synthetic ratio computation unit computes the synthetic ratio in response to the reliability computed by the reliability computational unit; and
   wherein the reliability computation unit:
      sets respective larger sizes of a base area including the target pixel in the base image and a reference area corresponding to the base area within the reference image processed by the motion compensation, as the contrast value of the target pixel becomes higher;
      computes one of a dissimilarity and a similarity between the base area and the reference area; and
      calculates the reliability such that the reliability becomes higher as the computed dissimilarity becomes smaller or as the computed similarity becomes larger.

6. A photographic imaging apparatus comprising the image processing device according to claim 5.

7. An image processing device for performing synthesis processing with a base image and at least one reference image to generate a synthetic image with a smaller amount of noise than the base image, the image processing device comprising:
   a motion-vector computation unit that computes a motion vector between the base image and the reference image;
   a motion compensation unit that performs a motion compensation to align the reference image with the base image based on the motion vector;
   a contrast computation unit that computes a contrast value of a target pixel for the synthesis processing in the base image based on one of the base image and the reference image;
   a synthetic ratio computation unit that computes a synthetic ratio between the target pixel of the base image and a corresponding pixel corresponding to the target pixel in the reference image processed by the motion compensation, in response to the contrast value computed by the contrast computation unit of the target pixel;

a synthesizing unit that synthesizes the target pixel of the base image and the corresponding pixel of the reference image based on the synthetic ratio; and a reliability computation unit that computes a reliability of the motion compensation for the target pixel in response to the contrast value computed by the contrast computation unit of the target pixel;

wherein the synthetic ratio computation unit computes the synthetic ratio in response to the reliability computed by the reliability computational unit; and wherein the reliability computation unit:
  filters a base area and a reference area with a low-pass filter, the base area including the target pixel of the base image, and the reference area corresponding to the base area within the reference image processed by the motion compensation;
  computes one of a dissimilarity and a similarity between the base area and the reference area after filtering with the low-pass filter;
  calculates the reliability such that the reliability becomes higher as the computed dissimilarity becomes smaller or as the computed similarity becomes larger; and
  sets a higher strength of the low-pass filter as the contrast value becomes higher.

8. A photographic imaging apparatus comprising the image processing device according to claim 7.

9. An image processing method of an image processing device for performing synthesis processing with a base image and at least one reference image to generate a synthetic image with a smaller amount of noise than the base image, the image processing method comprising:
  computing a motion vector between the base image and the reference image;
  performing a motion compensation to align the reference image with the base image based on the motion vector;
  computing a contrast value of a target pixel for the synthesis processing in the base image based on one of the base image and the reference image;
  computing a synthetic ratio between the target pixel of the base image and a corresponding pixel corresponding to the target pixel in the processed reference image, in response to the computed contrast value of the target pixel; and
  synthesizing the target pixel of the base image and the corresponding pixel of the reference image based on the synthetic ratio;
  wherein computing the contrast value of the target pixel comprises, within an area including the target pixel, computing a maximum value of a difference between an average value of one of luminance and brightness within the area, and one of luminance and brightness of each pixel, as the contrast value of the target pixel.

10. An image processing method of an image processing device for performing synthesis processing with a base image and at least one reference image to generate a synthetic image with a smaller amount of noise than the base image, the image processing method comprising:
  computing a motion vector between the base image and the reference image;
  performing a motion compensation to align the reference image with the base image based on the motion vector;
  computing a contrast value of a target pixel for the synthesis processing in the base image based on one of the base image and the reference image;
  computing a synthetic ratio between the target pixel of the base image and a corresponding pixel corresponding to the target pixel in the processed reference image, in response to the computed contrast value of the target pixel;
  synthesizing the target pixel of the base image and the corresponding pixel of the reference image based on the synthetic ratio; and
  computing a reliability of the motion compensation for the target pixel in response to the computed contrast value of the target pixel;
  wherein the synthetic ratio is computed in response to the computed reliability; and
  wherein computing the reliability comprises:
    computing one of a dissimilarity and a similarity between a base area including the target pixel of the base image, and a reference area corresponding to the base area within the reference image processed by the motion compensation,
    performing one of a correction to reduce the computed dissimilarity and a correction to increase the computed similarity, in response to the computed contrast value of the target pixel; and
    calculating the reliability such that the reliability becomes higher as the corrected dissimilarity becomes smaller or as the corrected similarity becomes larger;
  wherein correction is performed such that one of the dissimilarity is reduced more or the similarity is increased more as the contrast value of the target pixel becomes higher, when the contrast value of the target pixel is within a range from a first threshold value to a second threshold value; and
  wherein correction is performed such that one of the dissimilarity and the similarity is corrected with a second correction amount independent from the contrast value, when the contrast value of the target pixel is equal to or more than the second threshold value.

11. An image processing method of an image processing device for performing synthesis processing with a base image and at least one reference image to generate a synthetic image with a smaller amount of noise than the base image, the image processing method comprising:
  computing a motion vector between the base image and the reference image;
  performing a motion compensation to align the reference image with the base image based on the motion vector;
  computing a contrast value of a target pixel for the synthesis processing in the base image based on one of the base image and the reference image;
  computing a synthetic ratio between the target pixel of the base image and a corresponding pixel corresponding to the target pixel in the processed reference image, in response to the computed contrast value of the target pixel;
  synthesizing the target pixel of the base image and the corresponding pixel of the reference image based on the synthetic ratio; and
  computing a reliability of the motion compensation for the target pixel in response to the computed contrast value of the target pixel;
  wherein the synthetic ratio is computed in response to the computed reliability; and
  wherein computing the reliability comprises:
    setting respective larger sizes of a base area including the target pixel in the base image and a reference area corresponding to the base area within the reference image processed by the motion compensation, as the contrast value of the target pixel becomes higher, computing one of a dissimilarity and a similarity between the base area and the reference area, and calculating the reliability such that the reliability becomes higher as the computed dissimilarity becomes smaller or as the computed similarity becomes larger.

12. An image processing method of an image processing device for performing synthesis processing with a base image and at least one reference image to generate a synthetic image with a smaller amount of noise than the base image, the image processing method comprising:

computing a motion vector between the base image and the reference image;

performing a motion compensation to align the reference image with the base image based on the motion vector;

computing a contrast value of a target pixel for the synthesis processing in the base image based on one of the base image and the reference image;

computing a synthetic ratio between the target pixel of the base image and a corresponding pixel corresponding to the target pixel in the processed reference image, in response to the computed contrast value of the target pixel;

synthesizing the target pixel of the base image and the corresponding pixel of the reference image based on the synthetic ratio; and computing a reliability of the motion compensation for the target pixel in response to the computed contrast value of the target pixel;

wherein the synthetic ratio is computed in response to the computed reliability; and wherein computing the reliability comprises:

filtering a base area and a reference area with a low-pass filter, the base area including the target pixel of the base image, and the reference area corresponding to the base area within the reference image processed by the motion compensation;

computing one of a dissimilarity and a similarity between the base area and the reference area after filtering with the low-pass filter;

calculating the reliability such that the reliability becomes higher as the computed dissimilarity becomes smaller or as the computed similarity becomes larger; and setting a higher strength of the low-pass filter as the contrast value becomes higher.

13. A computer-readable recording device having an image processing program coded and recorded thereon in a computer-readable format for controlling an image processing device to perform synthesis processing with a base image and at least one reference image to generate a synthetic image with a smaller amount of noise than the base image, said program controlling the image processing device to perform operations comprising:

computing a motion vector between the base image and the reference image;

performing a motion compensation to align the reference image with the base image based on the motion vector;

computing a contrast value of a target pixel for the synthesis processing in the base image based on one of the base image and the reference image;

computing a synthetic ratio between the target pixel of the base image and a corresponding pixel corresponding to the target pixel in the processed reference image, in response to the computed contrast value of the target pixel; and synthesizing the target pixel of the base image and the corresponding pixel of the reference image based on the synthetic ratio;

wherein computing the contrast value of the target pixel comprises, within an area including the target pixel, computing a maximum value of a difference between an average value of one of luminance and brightness within the area, and one of luminance and brightness of each pixel, as the contrast value of the target pixel.

14. A computer-readable recording device having an image processing program coded and recorded thereon in a computer-readable format for controlling an image processing device to perform synthesis processing with a base image and at least one reference image to generate a synthetic image with a smaller amount of noise than the base image, said program controlling the image processing device to perform operations comprising:

computing a motion vector between the base image and the reference image;

performing a motion compensation to align the reference image with the base image based on the motion vector;

computing a contrast value of a target pixel for the synthesis processing in the base image based on one of the base image and the reference image;

computing a synthetic ratio between the target pixel of the base image and a corresponding pixel corresponding to the target pixel in the processed reference image, in response to the computed contrast value of the target pixel;

synthesizing the target pixel of the base image and the corresponding pixel of the reference image based on the synthetic ratio; and computing a reliability of the motion compensation for the target pixel in response to the computed contrast value of the target pixel;

wherein the synthetic ratio is computed in response to the computed reliability; and wherein computing the reliability comprises:

computing one of a dissimilarity and a similarity between a base area including the target pixel of the base image, and a reference area corresponding to the base area within the reference image processed by the motion compensation, performing one of a correction to reduce the computed dissimilarity and a correction to increase the computed similarity, in response to the computed contrast value of the target pixel; and calculating the reliability such that the reliability becomes higher as the corrected dissimilarity becomes smaller or as the corrected similarity becomes larger;

wherein correction is performed such that one of the dissimilarity is reduced more or the similarity is increased more as the contrast value of the target pixel becomes higher, when the contrast value of the target pixel is within a range from a first threshold value to a second threshold value; and wherein correction is performed such that one of the dissimilarity and the similarity is corrected with a second correction amount independent from the contrast value, when the contrast value of the target pixel is equal to or more than the second threshold value.

15. A computer-readable recording device having an image processing program coded and recorded thereon in a computer-readable format for controlling an image processing device to perform synthesis processing with a base image and at least one reference image to generate a synthetic image with a smaller amount of noise than the base image, said program controlling the image processing device to perform operations comprising:

computing a motion vector between the base image and the reference image;

performing a motion compensation to align the reference image with the base image based on the motion vector;

computing a contrast value of a target pixel for the synthesis processing in the base image based on one of the base image and the reference image;

computing a synthetic ratio between the target pixel of the base image and a corresponding pixel corresponding to the target pixel in the processed reference image, in response to the computed contrast value of the target pixel;

synthesizing the target pixel of the base image and the corresponding pixel of the reference image based on the synthetic ratio; and computing a reliability of the motion compensation for the target pixel in response to the computed contrast value of the target pixel;

wherein the synthetic ratio is computed in response to the computed reliability; and wherein computing the reliability comprises:

setting respective larger sizes of a base area including the target pixel in the base image and a reference area corresponding to the base area within the reference image processed by the motion compensation, as the contrast value of the target pixel becomes higher, computing one of a dissimilarity and a similarity between the base area and the reference area, and calculating the reliability such that the reliability becomes higher as the computed dissimilarity becomes smaller or as the computed similarity becomes larger.

16. A computer-readable recording device having an image processing program coded and recorded thereon in a computer-readable format for controlling an image processing device to perform synthesis processing with a base image and at least one reference image to generate a synthetic image with a smaller amount of noise than the base image, said program controlling the image processing device to perform operations comprising:

computing a motion vector between the base image and the reference image;

performing a motion compensation to align the reference image with the base image based on the motion vector;

computing a contrast value of a target pixel for the synthesis processing in the base image based on one of the base image and the reference image;

computing a synthetic ratio between the target pixel of the base image and a corresponding pixel corresponding to the target pixel in the processed reference image, in response to the computed contrast value of the target pixel;

synthesizing the target pixel of the base image and the corresponding pixel of the reference image based on the synthetic ratio; and computing a reliability of the motion compensation for the target pixel in response to the computed contrast value of the target pixel;

wherein the synthetic ratio is computed in response to the computed reliability; and wherein computing the reliability comprises:

filtering a base area and a reference area with a low-pass filter, the base area including the target pixel of the base image, and the reference area corresponding to the base area within the reference image processed by the motion compensation;

computing one of a dissimilarity and a similarity between the base area and the reference area after filtering with the low-pass filter;

calculating the reliability such that the reliability becomes higher as the computed dissimilarity becomes smaller or as the computed similarity becomes larger; and setting a higher strength of the low-pass filter as the contrast value becomes higher.

\* \* \* \* \*